(12) United States Patent
Li et al.

(10) Patent No.: US 11,269,073 B2
(45) Date of Patent: Mar. 8, 2022

(54) ELECTRONIC DEVICE, SCREEN-OFF PROCESSING METHOD, AND SCREEN-OFF PROCESSING DEVICE

(71) Applicant: VIVO MOBILE COMMUNICATION CO., LTD., Chang'an Dongguan (CN)

(72) Inventors: Sheng Li, Chang'an Dongguan (CN); Xuejie Yang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 172 days.

(21) Appl. No.: 16/479,116

(22) PCT Filed: Dec. 29, 2017

(86) PCT No.: PCT/CN2017/119892
§ 371 (c)(1),
(2) Date: Jul. 18, 2019

(87) PCT Pub. No.: WO2018/137469
PCT Pub. Date: Aug. 2, 2018

(65) Prior Publication Data
US 2019/0361120 A1 Nov. 28, 2019

(30) Foreign Application Priority Data
Jan. 25, 2017 (CN) .......................... 201710056821.0

(51) Int. Cl.
*G01S 17/08* (2006.01)
*G01S 17/88* (2006.01)
*G06F 3/042* (2006.01)

(52) U.S. Cl.
CPC .............. *G01S 17/08* (2013.01); *G01S 17/88* (2013.01); *G06F 3/0421* (2013.01)

(58) Field of Classification Search
CPC ........ G01S 17/08; G01S 17/88; G01S 7/4816; G06F 1/3231; G06F 3/0421; G06F 3/0487; G06F 3/0488; Y02D 10/00
(Continued)

(56) References Cited

U.S. PATENT DOCUMENTS

2012/0176345 A1* 7/2012 Ye .......................... G06F 3/0418
345/175
2015/0358183 A1* 12/2015 Soga ..................... H04L 1/0047
370/329
(Continued)

FOREIGN PATENT DOCUMENTS

| CN | 102984372 A | 3/2013 |
|---|---|---|
| CN | 104811546 A | 7/2015 |

(Continued)

OTHER PUBLICATIONS

Extended European Search Report related to Application. No. 17893701.7 dated Jan. 29, 2020.
(Continued)

*Primary Examiner* — Sunghee Y Gray
(74) *Attorney, Agent, or Firm* — von Briesen & Roper, s.c.

(57) ABSTRACT

An electronic device includes an infrared distance measurement apparatus and a touch panel. The touch panel covers the infrared distance measurement apparatus. The infrared distance measurement apparatus includes an infrared-light-emitting tube and at least two infrared-light-receiving tubes. The at least two infrared-light-receiving tubes include a far-channel receiving tube and a near-channel receiving tube, and a distance between the far-channel receiving tube and the infrared-light-emitting tube is greater than a distance between the near-channel receiving tube and the infrared-light-emitting tube.

19 Claims, 6 Drawing Sheets

(58) Field of Classification Search
USPC .......................................................... 356/51
See application file for complete search history.

(56) References Cited

U.S. PATENT DOCUMENTS

| | | |
|---|---|---|
| 2016/0061588 A1 | 3/2016 | Cho et al. |
| 2016/0146938 A1 | 5/2016 | Becker et al. |
| 2016/0246447 A1* | 8/2016 | Wang .................. G06F 3/0421 |

FOREIGN PATENT DOCUMENTS

| | | |
|---|---|---|
| CN | 204667272 U | 9/2015 |
| CN | 105628654 A | 6/2016 |
| CN | 106249872 A | 12/2016 |
| CN | 106303023 A | 1/2017 |
| CN | 106873879 A | 6/2017 |

OTHER PUBLICATIONS

International Search Report related to Application No. PCT/CN2017/119892 dated Jul. 30, 2019.
First CN Office Action related to Application No. 201710056821.0 dated Mar. 28, 2019.

* cited by examiner

Fig.7

ELECTRONIC DEVICE, SCREEN-OFF PROCESSING METHOD, AND SCREEN-OFF PROCESSING DEVICE

CROSS-REFERENCE TO RELATED APPLICATION

This patent application is a 35 USC § 371 U.S. national stage of International Application No. PCT/CN2017/119892 filed on Dec. 29, 2017, which claims a priority of the Chinese Patent Application No. 201710056821.0 filed on Jan. 25, 2017, which is incorporated herein by reference in its entirety.

TECHNICAL FIELD

The present disclosure relates to the field of communication technology, in particular to an electronic device, a screen-off processing method, and a screen-off processing device.

BACKGROUND

Along with the development of science and technology, electronic devices are increasingly demanded, especially aesthetic requirement for an appearance of a mobile terminal.

Usually, the mobile terminal is provided with a distance sensor, which is configured to measure a distance through transmitting and receiving infrared light. When the distance sensor is arranged in the mobile terminal, it is necessary to provide an opening in a touch panel, and fill the hole with black ink through which the infrared light is allowed to pass. In this way, it is able to provide sufficient light transmittance, thereby to enable a sufficient amount of reflected infrared light to be detected.

A touch panel of a black mobile terminal is in a same color as the black opening, so the opening is not so obvious. However, for a mobile terminal in white or any other color or for any other electronic device whose appearance is highly demanded, there is a remarkable appearance contrast between the opening and the electronic device, so the user experience may be adversely affected.

When the touch panel directly covers the distance sensor, i.e., no opening is formed in the touch panel, a majority of the infrared light generated by the distance sensor may be reflected by the touch panel, resulting in a large ground noise. At this time, it is impossible to measure the distance accurately, and thereby it is impossible to perform a screen-off processing on the mobile terminal based on the measured distance.

SUMMARY

An object of the present disclosure is to provide an electronic device.

In one aspect, the present disclosure provides in some embodiments an electronic device, including an infrared distance measurement apparatus and a touch panel covering the infrared distance measurement apparatus. The infrared distance measurement apparatus includes an infrared-light-emitting tube and at least two infrared-light-receiving tubes. The at least two infrared-light-receiving tubes include a far-channel receiving tube and a near-channel receiving tube, and a distance between the far-channel receiving tube and the infrared-light-emitting tube is greater than a distance between the near-channel receiving tube and the infrared-light-emitting tube.

In another aspect, the present disclosure provides in some embodiments a screen-off processing method for the electronic device, including: enabling an infrared-light-emitting tube to emit an infrared light beam; enabling a far-channel receiving tube to receive a first reflected light beam acquired after the infrared light beam is reflected by a to-be-measured object, so as to acquire a first distance value; when the first distance value is within a predetermined screen-off distance range, performing screen-off processing on the electronic device; when the first distance value is not within the predetermined screen-off distance range and is within a predetermined switching distance range, enabling a near-channel receiving tube to receive a second reflected light beam acquired after the infrared light beam is reflected by the to-be-measured object, so as to acquire a second distance value; and when the second distance value is within a predetermined dead zone distance range, performing the screen-off processing on the electronic device.

In yet another aspect, the present disclosure provides in some embodiments a screen-off processing device for the electronic device, including: an infrared light emission module configured to enable an infrared-light-emitting tube to emit an infrared light beam; a first distance value acquisition module configured to enable a far-channel receiving tube to receive a first reflected light beam acquired after the infrared light beam is reflected by a to-be-measured object, so as to acquire a first distance value; a screen-off processing module configured to, when the first distance value is within a predetermined screen-off distance range, perform screen-off processing on the electronic device; a second distance value acquisition module configured to, when the first distance value is not within the predetermined screen-off distance range and is within a predetermined switching distance range, enable a near-channel receiving tube to receive a second reflected light beam acquired after the infrared light beam is reflected by the to-be-measured object, so as to acquire a second distance value; and a second screen-off processing module configured to, when the second distance value is within a predetermined dead zone distance range, perform the screen-off processing on the electronic device.

BRIEF DESCRIPTION OF DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain other drawings without any creative effort.

DETAILED DESCRIPTION OF THE EMBODIMENTS

In order to make the objects, the technical solutions and the advantages of the present disclosure more apparent, the present disclosure will be described hereinafter in details in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

First Embodiment

Figure 1:
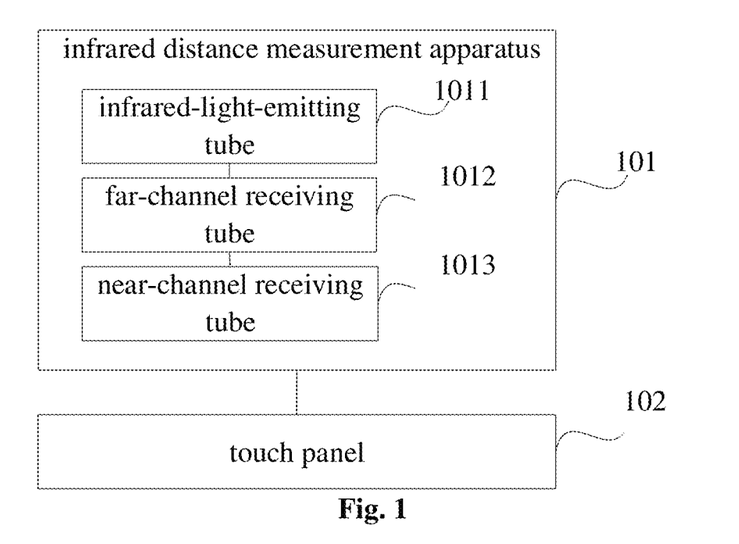
FIG. 1 is a schematic view showing an electronic device according to one embodiment of the present disclosure.

As shown in FIG. 1, the present disclosure provides in this embodiment an electronic device.

The electronic device may include an infrared distance measurement apparatus 101 and a touch panel 102 covering the infrared distance measurement apparatus 101. The infrared distance measurement apparatus 101 may include an infrared-light-emitting tube 1011 and at least two infrared-light-receiving tubes. The at least two infrared-light-receiving tubes may include a far-channel receiving tube 1012 and a near-channel receiving tube 1013, and a distance between the far-channel receiving tube 1012 and the infrared-light-emitting tube 1011 may be greater than a distance between the near-channel receiving tube 1013 and the infrared-light-emitting tube 1011.

According to the first embodiment of the present disclosure, the touch panel of the electronic device may cover the infrared distance measurement apparatus, the infrared distance measurement apparatus may include one infrared-light-emitting tube and at least two infrared-light-receiving tubes, the at least two infrared-light-receiving tubes may include the far-channel receiving tube and the near-channel receiving tube, and the distance between the far-channel receiving tube and the infrared-light-emitting tube may be greater than the distance between the near-channel receiving tube and the infrared-light-emitting tube. At this time, even when a majority of the infrared light beams are reflected by the touch panel and a large low noise occurs, it is still able to prevent the influence caused by the low noise through the far-channel receiving tube. In addition, through the near-channel receiving tube, it is able to prevent the occurrence of a reflection dead zone, and switch between the far-channel receiving tube and the near-channel receiving tube when no opening is formed in the touch panel, thereby to ensure the accuracy of the distance measurement by the infrared distance measurement apparatus, and improve the user experience as well as the appearance of the electronic device.

Second Embodiment

As shown in FIG. 1, the present disclosure provides in this embodiment an electronic device. The electronic device may be a smart phone, a Personal Digital Assistant (PDA), a Personal Computer (PC), a smart robot, a smart wearable device, or the like. An operating system of the electronic device may include Android, iOS, Windows Phone, Windows, or the like, which will not be particularly defined herein.

During the implementation, the electronic device may include an infrared distance measurement apparatus 101 and a touch panel 102.

The infrared distance measurement apparatus 101 may be a distance sensor, e.g., an infrared pulse sensor. The distance sensor is configured to detect a physical variation of an object through various elements and convert the physical variation into a distance between the distance sensor and the object. The touch panel 102 may be acquired by coating an Antimony-doped Tin Oxide (ATO) layer and a hard coat layer onto a transparent glass substrate.

In this embodiment, the touch panel 102 may cover the infrared distance measurement apparatus 101, i.e., it is unnecessary to form an opening in the touch panel 102, and the infrared distance measurement apparatus 101 may measure the distance accurately tough the touch panel 102. As a result, it is able to improve the appearance of the electronic device, thereby to improve the user experience.

To be specific, the infrared distance measurement apparatus 101 may include one infrared-light-emitting tube 1011 and at least two infrared-light-receiving tubes. The at least two infrared-light-receiving tubes may include a far-channel receiving tube 1012 and a near-channel receiving tube 1013. The infrared distance measurement apparatus 101 is capable of being switched between using the far-channel receiving tube 1012 and using the near-channel receiving tube 1013.

In actual use, the electronic device may be operated at predetermined far-channel transmission power and predetermined near-channel transmission power, wherein the far-channel transmission power is greater than the near-channel transmission power.

In order to enable a sufficient amount of infrared light beams to pass through the touch panel during the detection of the far-channel receiving tube 1012, the infrared-light-emitting tube 1011 may emit the infrared light beam at the predetermined far-channel transmission power when the far-channel receiving tube 1012 is in an on state. Alternatively, in order to prevent the near-channel receiving tube 1013 from being in a data saturation state during the detection, the infrared-light-emitting tube 1011 may emit the infrared light beam at the predetermined near-channel transmission power when the near-channel receiving tube 1013 is in an on state.

After the infrared-light-emitting tube 1011 has emitted the infrared light beam, the far-channel receiving tube 1012 may receive a first reflected light beam acquired after the infrared light beam is reflected by a to-be-measured object, and the electronic device may acquire a first distance value based on the first reflected light beam. When the first distance value acquired by the electronic device based on the first reflected light beam is not within a predetermined screen-off distance range and is within a predetermined switching distance range, the near-channel receiving tube 1013 may receive a second reflected light beam acquired after the infrared light beam is reflected by the to-be-measured object.

In a possible embodiment of the present disclosure, a distance between the far-channel receiving tube 1012 and the infrared-light-emitting tube 1011 may be greater than a distance between the near-channel receiving tube 1013 and the infrared-light-emitting tube 1011.

For example, the distance between the far-channel receiving tube 1012 and the infrared-light-emitting tube 1011 may be set as being relatively larger, 13 cm, so as to detect the distance successfully. The distance between the near-channel receiving tube 1013 and the infrared-light-emitting tube 1011 may be set as relatively small. e.g., 3 cm, such that the near-channel receiving tube 1013 may be arranged within a detection dead zone range of the far-channel receiving tube 1012, so as to prevent the occurrence of the detection dead zone of the far-channel receiving tube 1012.

Figure 2:
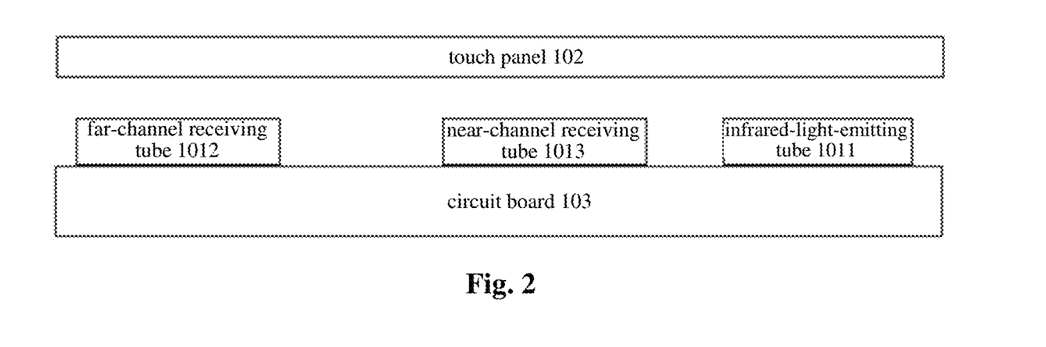
FIG. 2 is another schematic view showing the electronic device according to one embodiment of the present disclosure.

As shown in FIG. 2, in actual use, the electronic device may further include a circuit board 103, and the infrared-light-emitting tube 1011, the far-channel receiving tube 1012 and the near-channel receiving tube 1013 may be arranged sequentially on the circuit board 103. For example, the infrared-light-emitting tube 1011, the far-channel receiving tube 1012 and the near-channel receiving tube 1013 may be arranged sequentially, horizontally on the circuit board 103.

According to the second embodiment of the present disclosure, the touch panel of the electronic device may cover the infrared distance measurement apparatus, the infrared distance measurement apparatus may include one infrared-light-emitting tube and at least two infrared-light-receiving tubes, the at least two infrared-light-receiving tubes may include the far-channel receiving tube and the near-channel receiving tube, and the distance between the far-channel receiving tube and the infrared-light-emitting tube may be greater than the distance between the near-channel receiving tube and the infrared-light-emitting tube. At this time, even when a majority of the infrared light beams are reflected by the touch panel and a lame low noise occurs, it is still able to prevent the influence caused by the low noise through the far-channel receiving tube. In addition, through the near-channel receiving tube, it is able to prevent the occurrence of a reflection dead zone, and switch between the far-channel receiving tube and the near-channel receiving tube when no opening is formed in the touch panel, thereby to ensure the accuracy of the distance measurement by the infrared distance measurement apparatus, and improve the user experience as well as the appearance of the electronic device.

Third Embodiment

Figure 3:
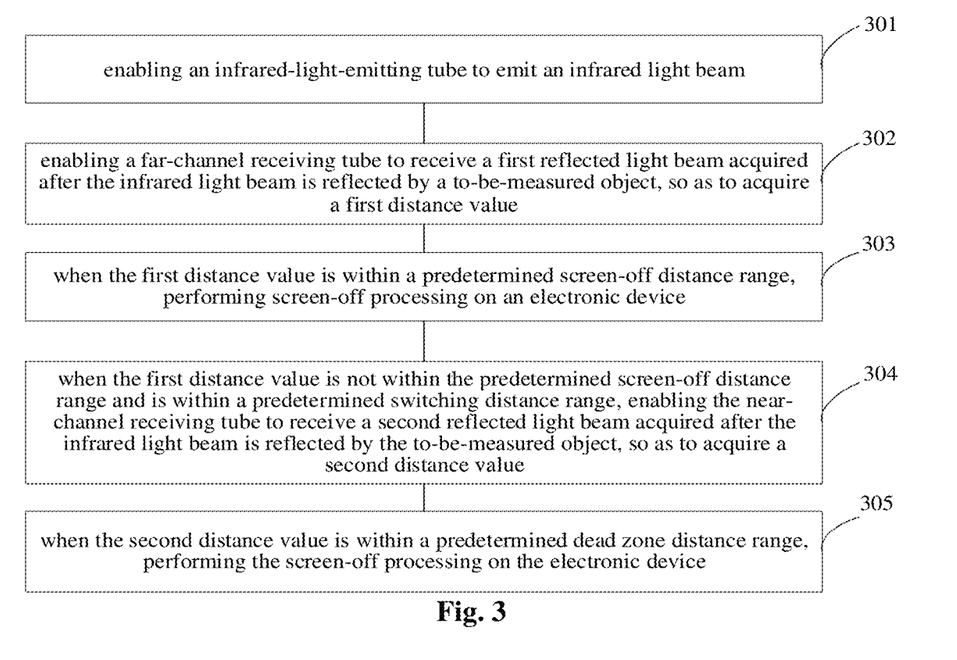
FIG. 3 is a flow chart of a screen-off processing method according to one embodiment of the present disclosure.

The present disclosure further provides in this embodiment a screen-off processing method for use in the above-mentioned electronic device. As shown in FIG. 3, the screen-off processing method may include the following steps.

Step 301: enabling the infrared-light-emitting tube to emit an infrared light beam.

In this embodiment, the electronic device may start the infrared-light-emitting tube so as to emit the infrared light beam.

Step 302: enabling the far-channel receiving tube to receive a first reflected light beam acquired after the infrared light beam is reflected by a to-be-measured object, so as to acquire a first distance value.

After the emission of the infrared light beam, the infrared light beam may be reflected by the to-be-measured object back to the electronic device. At this time, the electronic device may receive, through the far-channel receiving tube, the first reflected light beam acquired after the infrared light beam is reflected by the to-be-measured object, and convert the acquired first reflected light beam into the first distance value.

Step 303: when the first distance value is within a predetermined screen-off distance range, performing screen-off processing on the electronic device.

When the detected first distance value is within the predetermined screen-off distance range, the screen-off processing may be performed on the electronic device, i.e., a screen of the electronic device may be turned off.

Step 304: when the first distance value is not within the predetermined screen-off distance range and is within a predetermined switching distance range, enabling the near-channel receiving tube to receive a second reflected light beam acquired after the infrared light beam is reflected by the to-be-measured object, so as to acquire a second distance value.

When the first distance value is not within the predetermined screen-off distance range and is within the predetermined switching distance range, the electronic device may receive, through the near-channel receiving tube, the second reflected light beam acquired after the infrared light beam is reflected by the to-be-measured object, and convert the second reflected light beam into the second distance value.

Step 305: when the second distance value is within a predetermined dead zone distance range, performing the screen-off processing on the electronic device.

When the second distance value is within the predetermined dead zone distance range, the screen-off processing may be performed on the electronic device, i.e., the screen of the electronic device may be turned off.

According to the third embodiment of the present disclosure, the touch panel of the electronic device may cover the infrared distance measurement apparatus, and the infrared distance measurement apparatus may include the infrared-light-emitting tube, the far-channel receiving tube and the near-channel receiving tube. The infrared-light-emitting tube be infrared light beam, and the far-channel receiving tube may receive the first reflected light beam acquired after the infrared light beam is reflected by the to-be-measured object, so as to acquire the first distance value. When the first distance value is within the predetermined screen-off distance range, the screen-off processing may be performed on the electronic device. When the first distance value is not within the predetermined screen-off distance range and is within the predetermined switching distance range, the near-channel receiving tube may receive the second reflected light beam acquired after the infrared light beam is reflected by the to-be-measured object, so as to acquire the second distance value. When the second distance value is within the predetermined dead zone distance range, the screen-off processing may be performed on the electronic device. As a result, it is able to switch between the far-channel receiving tube and the near-channel receiving tube when no opening is formed in the touch panel, and ensure the accuracy of the distance measurement by the infrared distance measurement apparatus while performing the screen-off processing on the electronic device in time, thereby to improve the user experience.

Fourth Embodiment

Figure 4A:
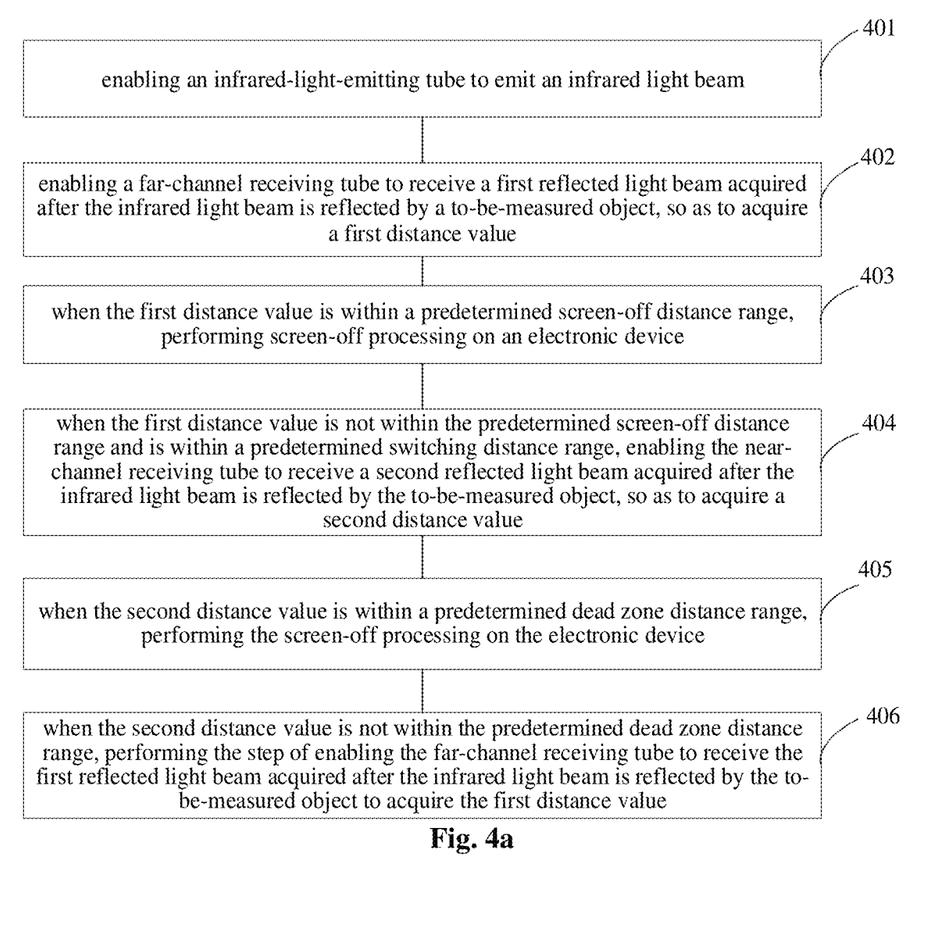
FIG. 4a is another flow chart of the screen-off processing method according to one embodiment of the present disclosure.

The present disclosure further provides in this embodiment a screen-off processing method for use in the above-mentioned electronic device. As shown in FIG. 4a, the screen-off processing method may include the following steps.

Step 401: enabling the infrared-light-emitting tube to emit an infrared light beam.

In actual use, after the electronic device has been powered on, the infrared distance measurement apparatus may be initialized. When a triggering condition for the distance measurement has been met, e.g., when a mobile terminal is adopted by a user to make a phone call, the infrared distance measurement apparatus may be started, so as to enable the infrared-light-emitting tube to emit the infrared light beam.

In a preferred embodiment of the present disclosure, Step 401 may include, when the near-channel receiving tube is in an on state, enabling the infrared-light-emitting tube to emit the infrared light beam at predetermined near-channel transmission power, and when the far-channel receiving tube is in an on state, enabling the infrared-light-emitting tube to emit the infrared light beam at predetermined far-channel transmission power.

In this embodiment, the electronic device may operate at the predetermined near-channel transmission power or the far-channel transmission power greater than the near-channel transmission power.

In order to prevent the occurrence data saturation during the near-channel detection, when the near-channel receiving tube is in the on state, the infrared-light-emitting tube of the electronic device may emit the infrared light beam at the near-channel transmission power.

In order to enable a sufficient amount of infrared light beams to pass through the touch panel during the far-channel detection, when the far-channel receiving tube is in the on state, the infrared-light-emitting tube of the electronic device may emit the infrared light beam at the far-channel transmission power.

Step 402: enabling the far-channel receiving tube to receive a first reflected light beam acquired after the infrared light beam is reflected by a to-be-measured object, so as to acquire a first distance value.

After the infrared-light-emitting tube has emitted the infrared light beam, the electronic device may receive through the far-channel receiving tube the first reflected light beam of the infrared light beam, and subject the first reflected light beam to photovoltaic conversion to acquire an electric signal. Then, the electric signal may be converted by an analog-to-digital converter (ADC) into the first distance value. The first distance value is reference data for calculating the distance between the electronic device and the to-be-measured object, i.e., the electronic device may calculate the distance between the electronic device and the to-be-measured object based on a change in the first distance value.

During the implementation, prior to Step 402, the screen-off processing method may further include enabling the far-channel receiving tube to be in the on state and enabling the near-channel receiving tube to be in an off state.

In this embodiment, the infrared distance measurement apparatus of the electronic device may be switched between using the far-channel receiving tube and using the near-channel receiving tube. When it is necessary to measure the distance through the far-channel receiving tube, the far-channel receiving tube may be in the on state and the near-channel receiving tube may be in the off state, so as to enable the electronic device to receive the first reflected light beam through the far-channel receiving tube.

Step 403: when the first distance value is within a predetermined screen-off distance range, performing screen-off processing on the electronic device.

Since the electronic device includes the predetermined screen-off distance range, when the first distance value is within the predetermined screen-off distance range, the screen-off processing may be performed on the electronic device, i.e., a screen of the electronic device may be turned off.

In a preferred embodiment of the present disclosure, subsequent to Step 403, the screen-off processing method may further include, when the first distance value is within a predetermined screen-on distance range, performing screen-on processing on the electronic device.

In this embodiment, the electronic device may include the predetermined screen-on distance range. After the screen-off processing has been performed on the electronic device, the electronic device may continue to measure the distance through the far-channel receiving tube, i.e., Step 402 may be performed continuously. When the acquired first distance value is within the predetermined screen-on distance range, the screen-on processing may be performed on the electronic device, i.e., the screen of the electronic device may be powered on.

Step 404: when the first distance value is not within the predetermined screen-off distance range and is within a predetermined switching distance range, enabling the near-channel receiving tube to receive a second reflected light beam acquired after the infrared light beam is reflected by the to-be-measured object, so as to acquire a second distance value.

In actual use, the electronic device may include the predetermined switching distance range. When the first distance value is not within the predetermined screen-off distance range and is within the predetermined switching distance range, the near-channel receiving tube may receive the second reflected light beam of the infrared light beam. The second reflected light beam may be subjected to photovoltaic conversion to acquire an electric signal, and the electric signal may be converted by an ADC into the second distance value. The second distance value may be reference data for calculating the distance between the electronic device and the to-be-measured object, i.e., the electronic device may calculate the distance between the electronic device and the to-be-measured object based on a change in the second distance value.

In a preferred embodiment of the present disclosure, prior to Step 404, the screen-off processing method may further include enabling the near-channel receiving tube to be in the on state and enabling the far-channel receiving tube to be in the off state.

In this embodiment of the present disclosure, the infrared distance measurement apparatus of the electronic device is capable of being switched between using the far-channel receiving tube and using the near-channel receiving tube. When it is necessary to measure the distance through the near-channel receiving tube, the electric device may enable the near-channel receiving tube to be in the on state and enable the far-channel receiving tube to be in the off state, so that the electronic device may receive the second reflected light beam through the near-channel receiving tube.

Step 405: when the second distance value is within a predetermined dead zone distance range, performing the screen-off processing on the electronic device.

In this embodiment, the electronic device may include the predetermined dead zone distance range. When the second distance value is within the predetermined dead zone distance range, the screen-off processing may be performed on the electronic device, i.e., the screen of the electronic device may be turned off.

In actual use, subsequent to Step 405, i.e., after the screen-off processing has been performed on the electronic device, the electronic device may continue to measure the distance through the near-channel receiving tube. When the acquired second distance value is within a second switching distance range, the electronic device may be switched to use the far-channel receiving tube for the distance measurement, i.e., Step 402 may be performed.

Step 406: When the second distance value is not within the predetermined dead zone distance range, performing the step of enabling the far-channel receiving tube to receive the first reflected light beam acquired after the infrared light beam is reflected by the to-be-measured object to acquire the first distance value.

In this embodiment, when the second distance value is not within the dead zone distance range, the electronic device may be switched to use the far-channel receiving tube for the distance measurement, i.e., Step 402 may be performed.

In order to enable a person skilled in the art to understand the screen-off processing method in a better manner, the screen-off processing method will be described hereinafter illustratively in conjunction with an example. It should be appreciated that, the present disclosure may not be limited thereto.

Figure 4B:
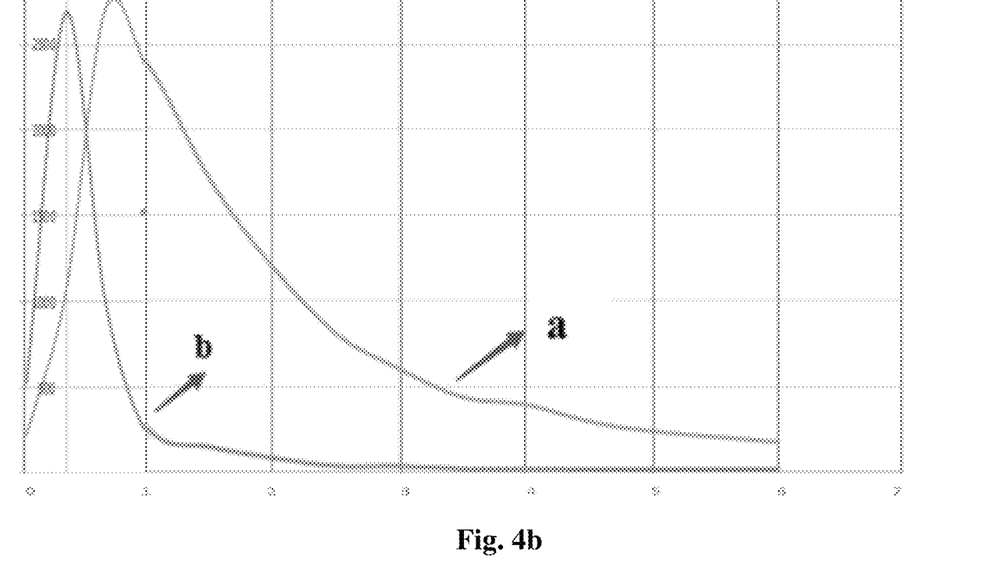
FIG. 4b is a curve diagram of a variation of a distance value according to one embodiment of the present disclosure.

As shown in FIG. 4b, a horizontal axis represents an actual distance between the to-be-measured object and the electronic device, and a vertical axis represents a distance value, i.e., the first distance value or the second distance value. Curve a represents a relationship between the first distance value acquired by the far-channel receiving tube and the actual distance, and curve b represents the relationship between the second distance value acquired by the near-channel receiving tube and the actual distance. The predetermined switching distance range may be 145 to 155, the predetermined dead zone distance range may be 345 to 2800, the predetermined screen-off distance range may be 595 to 605, and the predetermined screen-on distance range may be 245 to 355.

When the electronic device gradually approaches to the to-be-measured object, i.e., when the actual distance between the electronic device and the to-be-measured object decreases gradually, the screen-off processing method may include the following steps.

1. The infrared-light-emitting tube may be enabled to emit the infrared light beam.

2. The far-channel receiving tube may receive the first reflected light beam acquired after the infrared light beam is reflected by the to-be-measured object, so as to acquire the first distance value.

3. When the electronic device approaches to the to-be-measured object and the first distance value is 150, the first distance value may not be within the predetermined screen-off distance range 595-605 but may be within the predetermined switching distance range 145-155. At this time, the first distance value 150 in curve a may correspond to two actual distances, and it is impossible for the electronic device to determine whether the to-be-measured object is in a real keeping-away state or the far-channel receiving tube is located at a dead zone. Then, the electronic device may be switched to using the near-channel receiving tube, so as to receive the second reflected light beam acquired after the infrared light beam is reflected by the to-be-measured object, thereby to acquire the second distance value.

4. The second distance value may be determined, and there may exist two circumstances for a determination result. In a first circumstance, when the second distance value is within the predetermined dead zone distance range 345-2800, i.e., when the far-channel receiving tube is located at the dead zone (e.g., the second distance value is 350), the screen-off processing may be performed on the electronic device. In a second circumstance, when the second distance value is not within the predetermined dead zone distance range 345-2800, i.e., when the to-be-measured object is in the real keeping-away state (e.g., the second distance value is 50), the above second step may be performed. In this example, when the electronic device approaches to the to-be-measured object and the to-be-measured object is still in the real keeping-away state (e.g., the second distance value is 50), the above second step may be performed.

5. When the first distance value acquired again is 600, i.e., within the predetermined screen-off distance range 595-605, the screen-off processing may be performed on the electronic device.

6. During the screen-off processing, the electronic device may continue to perform the above second step. When the first distance value acquired subsequently is 300, i.e., within the predetermined screen-on distance range 245-355, the screen-on processing may be performed on the electronic device.

According to the fourth embodiment of the present disclosure, the touch panel of the electronic device may cover the infrared distance measurement apparatus, and the infrared distance measurement apparatus may include the infrared-light-emitting tube, the far-channel receiving tube and the near-channel receiving tube. The infrared-light-emitting tube may emit the infrared light beam, and the far-channel receiving tube may receive the first reflected light beam acquired after the infrared light beam is reflected by the to-be-measured object, so as to acquire the first distance value. When the first distance value is within the predetermined screen-off distance range, the screen-off processing may be performed on the electronic device. When the first distance value is not within the predetermined screen-off distance range and is within the predetermined switching distance range, the near-channel receiving tube may receive the second reflected light beam acquired after the infrared light beam is reflected by the to-be-measured object, so as to acquire the second distance value. When the second distance value is within the predetermined dead zone distance range, the screen-off processing may be performed on the electronic device. As a result, it is able to switch between the far-channel receiving tube and the near-channel receiving tube when no opening is formed in the touch panel, and ensure the accuracy of the distance measurement by the infrared distance measurement apparatus while performing the screen-off processing on the electronic device in time, thereby to improve the user experience.

For ease of description, the above-mentioned method has been described on the basis of a series of steps, and a person skilled in the art understands that, these steps may also be performed in any other order or simultaneously. In addition, a person skilled in the art also understands that, the above embodiments are preferred embodiments only, and the steps involved therein are not always necessary.

Fifth Embodiment

Figure 5A:
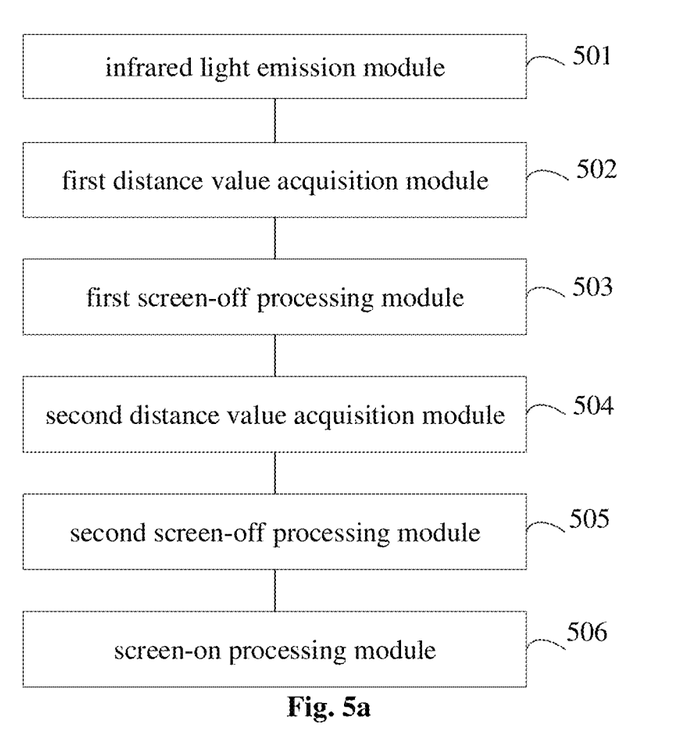
FIG. 5a is a schematic view showing a screen-off processing device according to one embodiment of the present disclosure.

The present disclosure further provides in this embodiment a screen-off processing device which, as shown in FIG. 5a, includes: an infrared light emission module 501 configured to enable an infrared-light-emitting tube to emit an infrared light beam; a first distance value acquisition module 502 configured to enable a far-channel receiving tube to receive a first reflected light beam acquired after the infrared light beam is reflected by a to-be-measured object, so as to acquire a first distance value; a first screen-off processing module 503 configured to, when the first distance value is within a predetermined screen-off distance range, perform screen-off processing on the electronic device; a second distance value acquisition module 504 configured to, when the first distance value is not within the predetermined screen-off distance range and is within a predetermined switching distance range, enable a near-channel receiving tube to receive a second reflected light beam acquired after the infrared light beam is reflected by the to-be-measured object, so as to acquire a second distance value; and a second screen-off processing module 505 configured to, when the second distance value is within a predetermined dead zone distance range, perform the screen-off processing on the electronic device.

In a preferred embodiment of the present disclosure, the screen-off processing device may further includes that, the first distance value acquisition module may be called when the second distance value is not within the predetermined dead zone distance range.

In a preferred embodiment of the present disclosure, the screen-off processing device may further include a screen-on processing module 506 configured to, when the first distance value is within a predetermined screen-on distance range, perform screen-on processing on the electronic device.

In a preferred embodiment of the present disclosure, the screen-off processing device may further include a first state setting module configured to set the far-channel receiving tube to be in an on state, and set the near-channel receiving tube to be in an off state.

In a preferred embodiment of the present disclosure, the screen-off processing device may further include a second state setting module configured to set the near-channel receiving tube to be in an on state, and set the far-channel receiving tube to be in an off state.

Figure 5B:
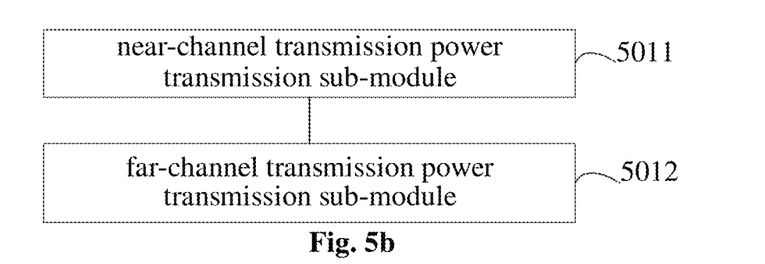
FIG. 5b is a schematic view showing an infrared emission module according to one embodiment of the present disclosure.

As shown in FIG. 5b, in a preferred embodiment of the present disclosure, the infrared light emission module 501 may include: a near-channel transmission power transmission sub-module 5011 configured to, when the near-channel receiving tube is in the on state, emit the infrared light beam through the infrared-light-emitting tube at predetermined near-channel transmission power; and a far-channel transmission power transmission sub-module 3012 configured to, when the far-channel receiving tube is in the on state, emit the infrared light beam through the infrared-light-emitting tube at predetermined far-channel transmission power greater than e near-channel transmission power.

According to the fifth embodiment of the present disclosure, the touch panel of the electronic device may cover the infrared distance measurement apparatus, and the infrared distance measurement apparatus may include the infrared-light-emitting tube, the far-channel receiving tube and the near-channel receiving tube. The infrared-light-emitting tube may emit the infrared light beam, and the far-channel receiving tube may receive the first reflected light beam acquired after the infrared light beam is reflected by the to-be-measured object, so as to acquire the first distance value. When the first distance value is within the predetermined screen-off distance range, the screen-off processing may be performed on the electronic device. When the first distance value is not within the predetermined screen-off distance range and is within the predetermined switching distance range, the near-channel receiving tube may receive the second reflected light beam acquired after the infrared light beam is reflected by the to-be-measured object, so as to acquire the second distance value. When the second distance value is within the predetermined dead zone distance range, the screen-off processing may be performed on the electronic device. As a result, it is able to switch between the far-channel receiving tube and the near-channel receiving tube when no opening is formed in the touch panel, and ensure the accuracy of the distance measurement by the infrared distance measurement apparatus while performing the screen-off processing on the electronic device in time, thereby to improve the user experience.

Sixth Embodiment

Figure 6:
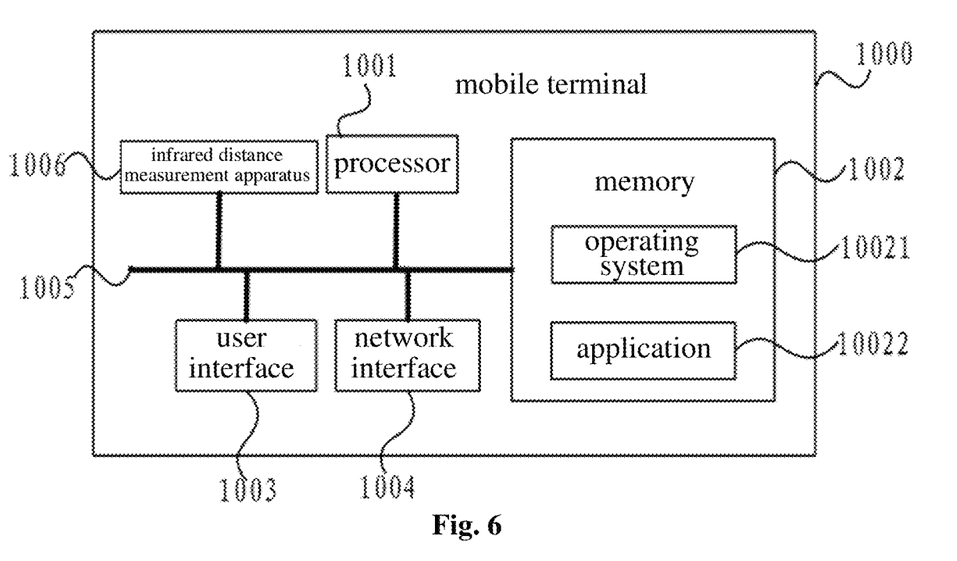
FIG. 6 is a schematic view showing a mobile terminal according to one embodiment of the present disclosure.

The present disclosure provides in this embodiment a mobile terminal 1000 which, as shown in FIG. 6, includes at least one processor 1001, a memory 1002, at least one network interface 1004, at least one user interface 1003, an infrared distance measurement apparatus 1006, and a touch panel (not shown). The components of the mobile terminal 1000 may be coupled together through a bus system 1005. It should be appreciated that, the bus system 1005 is configured to achieve connection and communication among the components. Apart from a data bus, the bus system 1005 may further include a power source bus, a control bus and a state signal bus. For clarification, all these buses in FIG. 6 may be collectedly called as bus system 1005.

The user interface 1003 may include a display, a keyboard or a pointing device (e.g., mouse, track ball, touch plate or touch panel).

The touch panel may cover the infrared distance measurement apparatus 1006. The infrared distance measurement apparatus 1006 may include one infrared-light-emitting tube and at least two infrared-light-receiving tubes. The at least two infrared-light-receiving tubes may include a far-channel receiving tube and a near-channel receiving tube. A distance between the far-channel receiving tube and the infrared-light-emitting tube may be greater than a distance between the near-channel receiving tube and the infrared-light-emitting tube.

In a possible embodiment of the present disclosure, the mobile terminal 1000 may further include a circuit board (not shown), and the infrared-light-emitting tube, the far-channel receiving tube and the near-channel receiving tube may be sequentially arranged on the circuit board.

In a possible embodiment of the present disclosure, the infrared-light-emitting tube is configured to, when the far-channel receiving tube is in an on state, emit an infrared light beam at predetermined far-channel transmission power, and when the near-channel receiving tube is in the on state, emit the infrared light beam at predetermined near-channel transmission power, wherein the far-channel transmission power is greater than the near-channel transmission power.

In a possible embodiment of the present disclosure, the far-channel receiving tube is configured to receive a first reflected light beam acquired after the infrared light beam is reflected by a to-be-measured object. The near-channel receiving tube is configured to, when a first distance value acquired by the electronic device based on the first reflected light beam is not within a predetermined screen-off distance range and is within a predetermined switching distance range, receive a second reflected light beam acquired after the infrared light beam is reflected by the to-be-measured object.

In a possible embodiment of the present disclosure, the infrared distance measurement apparatus 1006 is capable of being switched between using the far-channel receiving tube and using the near-channel receiving tube.

It should be appreciated that, the memory 1002 may be a volatile memory, a nonvolatile memory or both. The nonvolatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but non-restrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). The memory 1002 intends to include, but not limited to, the above-mentioned and any other appropriate memories.

In a possible embodiment of the present disclosure, the following elements may be stored in the memory 1002: an executable module or data structure, a subset or an extended set thereof, an operating system 10021 and an application 10022.

The operating system 10021 may include various system programs, e.g., a framework layer, a core layer and a driving layer, so as to implement various basic services and process hardware-based tasks. The application 10022 may include various applications, e.g., a camera application, a Media Player and a Browser, so as to implement various application services. The programs for implementing the above-mentioned method may be included in the application 10022.

In this embodiment, through calling a program or instruction stored in the memory 1002, e.g., a program or instruction stored in the application 10022, the processor 1001 is configured to: enable the infrared-light-emitting tube to emit the infrared light beam; enable the far-channel receiving tube to receive the first reflected light beam acquired after the infrared light beam is reflected by the to-be-measured object, so as to acquire the first distance value; when the first distance value is within the predetermined screen-off distance range, perform the screen-off processing on the electronic device; when the first distance value is not within the predetermined screen-off distance range and is within the predetermined switching distance range, enable the near-channel receiving tube to receive the second reflected light beam acquired after the infrared light beam is reflected by the to-be-measured object, so as to acquire the second distance value; and when the second distance value is within a predetermined dead zone distance range, perform the screen-off processing on the electronic device.

The above-mentioned method may be applied to, or implemented by, the processor 1001. The processor 1001 may be an integrated circuit (IC) having a signal processing capability. During the implementation, the steps of the above-mentioned method may be completed through an integrated logic circuit of hardware in the processor 1101 or instructions in the form of software. The processor 1101 may be a general-purpose processor, a Digital Signal Processor (DSP), an Application-Specific Integrated Circuit (ASIC), a Field Programmable Gate Array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the decoding processor in the form of hardware, or a combination of hardware and software modules in the decoding processor. The software module may be located in a known storage medium such as an RAM, a flash memory, an ROM, a PROM, an EEPROM, or a register. The storage medium may be located in the memory 1002, and the processor 1001 may read information stored in the memory 1002 so as to implement the steps of the method in conjunction with the hardware.

It should be appreciated that, the embodiments of the present disclosure may be implemented by hardware, software, firmware, middleware, microcode or a combination thereof. For the hardware implementation, the processor may include one or more of an ASIC, a DSP, a DSP device (DSPD), a Programmable Logic Device (PLD), an FPGA, a general-purpose processor, a controller, a microcontroller, a microprocessor, any other electronic unit capable of achieving the functions in the present disclosure, or a combination thereof.

For the software implementation, the scheme the embodiments of the present disclosure may be implemented through modules capable of achieving the functions in the present disclosure (e.g., processes or functions). Software codes may be stored in the memory and executed by the processor. The memory may be implemented inside or outside the processor.

In a possible embodiment of the present disclosure, the processor 1001 is further configured to, when the second distance value is not within the predetermined dead zone distance range, enable the far-channel receiving tube to receive the first reflected light beam acquired after the infrared light beam is reflected by the to-be-measured object, so as to acquire the first distance value.

In a possible embodiment of the present disclosure, the processor 1001 is further configured to, when the first distance value is within the predetermined screen-on distance range, perform screen-on processing on the electronic device.

In a possible embodiment of the present disclosure, the processor 1001 is further configured to enable the far-channel receiving tube to be in the on state, and enable the near-channel receiving tube to be in the off state.

In a possible embodiment of the present disclosure, the processor 1001 is further configured to enable the near-channel receiving tube to be in the on state, and enable the far-channel receiving tube to be in the off state.

In a possible embodiment of the present disclosure, the processor 1001 is further configured to, when the infrared-light-emitting tube is enabled to emit the infrared light beam and the near-channel receiving tube is in the on state, enable the infrared-light-emitting tube to emit the infrared light beam at predetermined near-channel transmission power, and when the far-channel receiving tube is in the on state, enable the infrared-light-emitting tube to emit the infrared light beam at predetermined far-channel transmission power greater than the near-channel transmission power.

The mobile terminal 1000 is capable of implementing the procedures implemented by the mobile terminal in the above-mentioned embodiments, which will not be particularly defined herein.

According to the mobile terminal 1000 in the sixth embodiment of the present disclosure, the touch panel of the electronic device may cover the infrared distance measurement apparatus, and the infrared distance measurement apparatus may include the infrared-light-emitting tube, the far-channel receiving tube and the near-channel receiving tube. The infrared-light-emitting tube may emit the infrared light beam, and the far-channel receiving tube may receive the first reflected light beam acquired after the infrared light beam is reflected by the to-be-measured object, so as to acquire the first distance value. When the first distance value is within the predetermined screen-off distance range, the screen-off processing may be performed on the electronic device. When the first distance value is not within the predetermined screen-off distance range and is within the predetermined switching distance range, the near-channel receiving tube may receive the second reflected light beam acquired after the infrared light beam is reflected by the to-be-measured object, so as to acquire the second distance value. When the second distance value is within the predetermined dead zone distance range, the screen-off processing may be performed on the electronic device. As a result, it is able to switch between the far-channel receiving tube and the near-channel receiving tube when no opening is formed in the touch panel, and ensure the accuracy of the distance measurement by the infrared distance measurement apparatus while performing the screen-off processing on the electronic device in time, thereby to improve the user experience.

Seventh Embodiment

Figure 7:
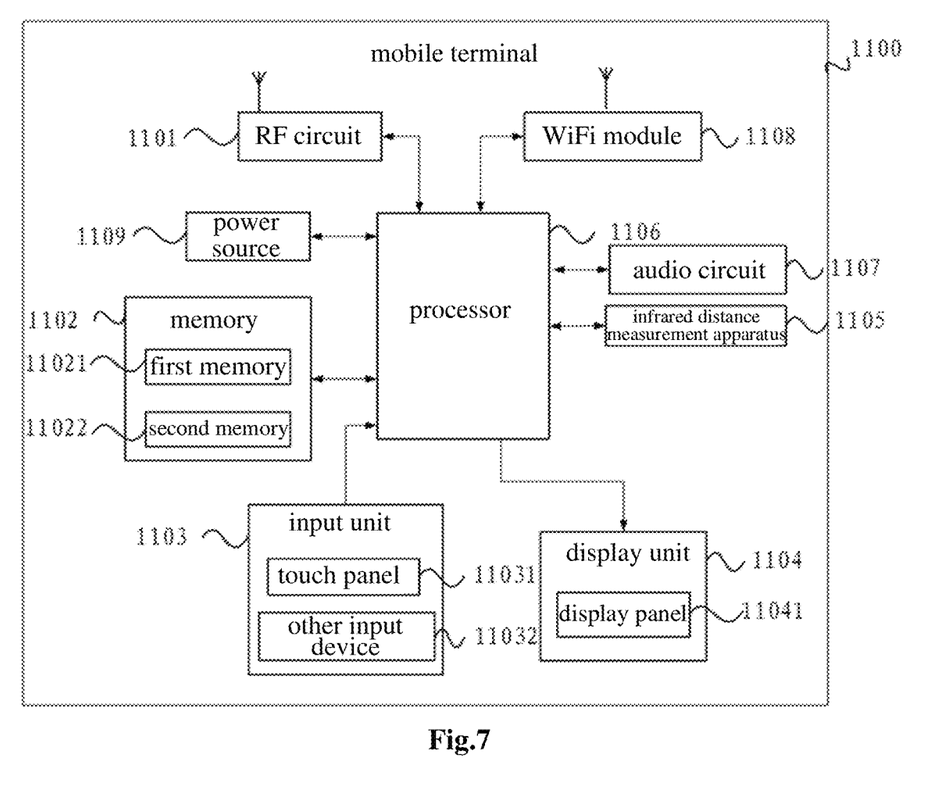
FIG. 7 is another schematic view showing the mobile terminal according to one embodiment of the present disclosure.

The present disclosure further provides in this embodiment a mobile terminal 1100, as shown in FIG. 7. The mobile terminal 1100 may be a mobile phone, a flat-panel computer, a Personal Digital Assistant (PDA) or a vehicle-mounted computer.

The mobile terminal 1100 in FIG. 7 may include a Radio Frequency (RF) circuit 1101, a memory 1102, an input unit 1103, a display unit 1104, a processor 1106, an audio circuit 1107, a Wireless Fidelity (WiFi) module 1108, a power source 1109 and an infrared distance measurement apparatus 1105.

The input unit 1103 is configured to receive digital or character information inputted by a user, and generate a signal input related to user settings and function control of the mobile terminal 1100. To be specific, the input unit 1103 may include a touch panel 11031. The touch panel 11031, also called as touch screen, is configured to collect a touch operation made by the user on or in proximity to the touch panel (e.g., an operation made by the user through any appropriate object or attachment (e.g., finger or stylus) on the touch panel 11031), drive a corresponding connection device based on a predetermined program. Optionally, the touch panel 1103 may include a touch detection device and a touch controller. The touch detection device is configured to detect a touch position of the user and a signal generated due to the touch operation, and transmit the signal to the touch controller. The touch controller is configured to receive touch information from the touch detection device, convert it into coordinates of a touch point, transmit the coordinates to the processor 1106, and receive and execute a command from the processor 1106. In addition, the touch panel 11031 may be of a resistive type, a capacitive type, an infrared type, a surface acoustic wave (SAW) type, or the like. Apart from the touch panel 11031, the input unit 1103 may further include another input device 11032 which may include, but not limited to, one or more of a physical keyboard, a functional button (e.g., a volume control button or an on/off button), a trackball, a mouse, and a joystick, which will not be particularly defined herein.

The display unit 1104 is configured to display information inputted by the user or information to be presented to the user, and various interfaces for the mobile terminal 1100, and it may include a display panel 11041. In a possible embodiment of the present disclosure, the display panel 11041 may be a Liquid Crystal Display (LCD) panel or an Organic Light-Emitting Diode (OLED) panel.

It should be appreciated that, the touch panel 11031 may cover the display panel 11041, so as to form a touch display panel. When the touch operation made on or in proximity to the touch display panel has been detected by the touch display panel, the touch information may be transmitted to the processor 1106 to determine a type of a touch event. Then, the processor 1106 may provide corresponding visual output on the touch display panel based on the type of the touch event.

The touch display panel may include an application interface display region and a commonly-used controls display region. An arrangement mode of the two display regions will not be particularly defined herein, e.g., one of the two display regions may be arranged above or under the other, or arranged to the left or the right of the other, so as to distinguish the two display regions from each other. The application interface display region may be adopted to display interfaces for applications, and each interface may include an icon for at least one application and/or an interface element such as Widget desktop control. The application interface display region may also be a blank interface where no content is contained. The commonly-used controls display region may be adopted to display controls which are used frequently, e.g., setting button, interface number, scroll bar, or such application icons as telephone book icon.

The touch panel 11031 may cover the infrared distance measurement apparatus 1105. The infrared distance measurement apparatus 1105 may include one infrared-light-emitting tube and at least two infrared-light-receiving tubes. The at least two infrared-light-receiving tubes may include a far-channel receiving tube and a near-channel receiving tube. A distance between the far-channel receiving tube and the infrared-light-emitting tube may be greater than a distance between the near-channel receiving tube and the infrared-light-emitting tube.

In a possible embodiment of the present disclosure, the mobile terminal 1100 may further include a circuit board (not shown), and the infrared-light-emitting tube, the far-channel receiving tube and the near-channel receiving tube may be sequentially arranged on the circuit board.

In a possible embodiment of the present disclosure, the infrared-light-emitting tube is configured to, when the far-channel receiving tube is in an on state, emit an infrared light beam at predetermined far-channel transmission power, or when the near-channel receiving tube is in the on state, emit the infrared light beam at predetermined near-channel transmission power, wherein the far-channel transmission power is greater than the near-channel transmission power.

In a possible embodiment of the present disclosure, the far-channel receiving tube is configured to receive a first reflected light beam acquired after the infrared light beam is reflected by a to-be-measured object. The near-channel receiving tube is configured to, when a first distance value acquired by the electronic device based on the first reflected light beam is not within a predetermined screen-off distance range and is within a predetermined switching distance range, receive a second reflected light beam acquired after the infrared light beam is reflected by the to-be-measured object.

In a possible embodiment of the present disclosure, the infrared distance measurement apparatus 1105 is capable of being switched between using the far-channel receiving tube and using the near-channel receiving tube.

The processor 1106 may be a control center of the mobile terminal 1100, and connected to each member of the entire mobile terminal via various interfaces and lines. The processor 1106 is configured to run or execute software programs and/or modules stored in a first memory 11021, and call data stored in a second memory 11022, so as to achieve various functions of the mobile terminal 1100 and process the data, thereby to monitor the mobile terminal 1100. In a possible embodiment of the present disclosure, the processor 1106 may include one or more processing units.

In the embodiment of the present disclosure, through calling a software program stored in the first memory 11021 and/or the data stored in the module and/or the second memory 11022, the processor 1106 is configured to: enable the infrared-light-emitting tube to emit the infrared light beam; enable the far-channel receiving tube to receive the first reflected light beam acquired after the infrared light beam is reflected by the to-be-measured object, so as to acquire the first distance value; when the first distance value is within the predetermined screen-off distance range, perform the screen-off processing on the electronic device; when the first distance value is not within the predetermined screen-off distance range and is within the predetermined switching distance range, enable the near-channel receiving tube to receive the second reflected light beam acquired after the infrared light beam is reflected by the to-be-measured object, so as to acquire the second distance value; and when the second distance value is within a predetermined dead zone distance range, perform the screen-off processing on the electronic device.

In a possible embodiment of the present disclosure, the processor 1106 is further configured to, when the second distance value is not within the predetermined dead zone distance range, enable the far-channel receiving tube to receive the first reflected light beam acquired after the infrared light beam is reflected by the to-be-measured object, so as to acquire the first distance value.

In a possible embodiment of the present disclosure, the processor 1106 is further configured to, when the first distance value is within the predetermined screen-on distance range, perform screen-on processing on the electronic device.

In a possible embodiment of the present disclosure, the processor 11466 is further configured to enable the far-channel receiving tube to be in the on state, and enable the near-channel receiving tube to be in the off state.

In a possible embodiment of the present disclosure, the processor 1106 is further configured to enable the near-channel receiving tube to be in the on state, and enable the far-channel receiving tube to be in the off state.

In a possible embodiment of the present disclosure, the processor 1106 is further configured to, when the infrared-light-emitting tube is enabled to emit the infrared light beam and the near-channel receiving tube is in the on state, enable the infrared-light-emitting tube to emit the infrared light beam at predetermined near-channel transmission power, and when the far-channel receiving tube is in the on state, enable the infrared-light-emitting tube to emit the infrared light beam at predetermined far-channel transmission power greater than the near-channel transmission power.

The mobile terminal 1100 is capable of implementing the procedures of the mobile terminal in the above-mentioned embodiments, which will not be particularly defined herein.

According to the mobile terminal 1100 in the sixth embodiment of the present disclosure, the touch panel of the electronic device may cover the infrared distance measurement apparatus, and the infrared distance measurement apparatus may include the infrared-light-emitting tube, the far-channel receiving tube and the near-channel receiving tube. The infrared-light-emitting tube may emit the infrared light beam, and the far-channel receiving tube may receive the first reflected light beam acquired after the infrared light beam is reflected by the to-be-measured object, so as to acquire the first distance value. When the first distance value is within the predetermined screen-off distance range, the screen-off processing may be performed on the electronic device. When the first distance value is not within the predetermined screen-off distance range and is within the predetermined switching distance range, the near-channel receiving tube may receive the second reflected light beam acquired after the infrared light beam is reflected by the to-be-measured object, so as to acquire the second distance value. When the second distance value is within the predetermined dead zone distance range, the screen-off processing may be performed on the electronic device. As a result, it is able to switch between the far-channel receiving tube and the near-channel receiving tube when no opening is formed in the touch panel, and ensure the accuracy of the distance measurement by the infrared distance measurement apparatus while performing the screen-off processing on the electronic device in time, thereby to improve the user experience.

The embodiments of the electronic device, the screen-off processing device and the mobile terminal may be substantially similar to that of the above-mentioned screen-off processing method, and thus are described herein in a simple manner. The relevant description may refer to that of the above-mentioned screen-off processing method.

The above embodiments have been described in a progressive manner, and the same or similar contents in the embodiments are not repeated, i.e., each embodiment merely focuses on the difference from the others.

It should be appreciated that, the present disclosure may be provided as a method, a device or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory. Compact Disc-Read Only Memory (CD-ROM) and optical memory) including computer-readable program codes.

The present disclosure has been described with reference to the flow charts and/or block diagrams of the method, terminal device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or another programmable data processing device to create a machine, so that instructions executable by the processor of the computer or the other programmable data processing device may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction device which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments based on the basic concept of the present disclosure. So, the attached claims are intended to include the preferred embodiments and all of the modifications and alterations that fall within the scope of the present disclosure.

At last, it should be further appreciated that, in the present disclosure, the relationship terms such as "first" and "second" are merely used to distinguish the entities or the operations from each other, instead of requiring or indicating that actual relationships or sequences among these entities or operations. Such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

The electronic device, the screen-off processing method and the screen-off processing device have been described above in details. In the present disclosure, the principles and the implementations have been provided through the embodiments, which are used to merely explain the methods and the core concepts of the present disclosure. A person skilled in the art may make further modifications and improvements on the implementations and applications without departing from the concepts of the present disclosure, and these modifications and improvements shall also fall within the scope of the present disclosure.

What is claimed is:

1. An electronic device, comprising an infrared distance measurement apparatus and a touch panel, wherein the touch panel covers the infrared distance measurement apparatus, the infrared distance measurement apparatus comprises one infrared-light-emitting tube and at least two infrared-light-receiving tubes, the at least two infrared-light-receiving tubes comprise a far-channel receiving tube and a near-channel receiving tube, and a distance between the far-channel receiving tube and the infrared-light-emitting tube is greater than a distance between the near-channel receiving tube and the infrared-light-emitting tube,
    wherein the electronic device further comprises a first processor, wherein the first processor is connected to the infrared-light-emitting tube and a power Controller of the infrared-light-emitting tube and a power controller of the infrared-light-emitting tube, wherein the first processor is configured to control the infrared-light-emitting tube to:
    when the far-channel receiving tube is in an on state and the near-channel receiving tube is in an off state, emit an infrared light beam at predetermined far-channel transmission power; or
    when the near-channel receiving tube is in the on state and the far-channel receiving diode is in the off state, emit the infrared light beam at predetermined near-channel transmission power;
    wherein the far-channel transmission power is greater than the near-channel transmission power.

2. The electronic device according to claim 1, further comprising a circuit board, wherein the infrared-light-emitting tube, the far-channel receiving tube, and the near-channel receiving tube are sequentially arranged on the circuit board.

3. The electronic device according to claim 1, wherein the first processor is connected to the far-channel receiving tube and the near-channel receiving tube, and the infrared distance measurement apparatus is capable of being switched between using the far-channel receiving tube and using the near-channel receiving tube under control of the first processor,
    wherein the far-channel receiving tube is configured to receive a first reflected light beam acquired after the infrared light beam is reflected by a to-be-measured object, the near-channel receiving tube is configured to, when a first distance value acquired by the electronic device based on the first reflected light beam is not within a predetermined screen-off distance range and is within a predetermined switching distance range, receive a second reflected light beam acquired after the infrared light beam is reflected by the to-be-measured object.

4. A screen-off processing method for the electronic device according to claim 1, comprising:
    enabling the infrared-light-emitting tube to emit an infrared light beam;
    enabling the far-channel receiving tube to receive a first reflected light beam acquired after the infrared light beam is reflected by a to-be-measured object, to acquire a first distance value;
when the first distance value is within a predetermined screen-off distance range, performing screen-off processing on the electronic device;
    when the first distance value is not within the predetermined screen-off distance range and is within a predetermined switching distance range, enabling the near-channel receiving tube to receive a second reflected light beam acquired after the infrared light beam is reflected by the to-be-measured object, to acquire a second distance value; and
    when the second distance value is within a predetermined dead zone distance range, performing the screen-off processing on the electronic device.

5. The screen-off processing method according to claim 4, further comprising:
    when the second distance value is not within the predetermined dead zone distance range, performing the step of enabling the far-channel receiving tube to receive the first reflected light beam acquired after the infrared light beam is reflected by the to-be-measured object to acquire the first distance value.

6. The screen-off processing method according to claim 4, wherein subsequent to performing the screen-off processing on the electronic device when the first distance value is within the predetermined screen-off distance range, the screen-off processing method further comprises:
    when the first distance value is within a predetermined screen-on distance range, performing screen-on processing on the electronic device.

7. The screen-off processing method according to claim 6, wherein the step of enabling the infrared-light-emitting tube to emit the infrared light beam comprises:
when the near-channel receiving tube is in an on state, enabling the infrared-light-emitting tube to emit the infrared light beam at predetermined near-channel transmission power; and
when the far-channel receiving tube is in the on state, enabling the infrared-light-emitting tube to emit the infrared light beam at predetermined far-channel transmission power,
wherein the far-channel transmission power is greater than the near-channel transmission power.

8. A screen-off processing device for an electronic device, comprising a second processor, and a memory storing therein a computer program executed by the second processor, wherein the second processor is configured to execute the computer program, to implement the screen-off processing method according to claim 4.

9. The screen-off processing device according to claim 8, the second processor is further configured to execute the computer program to:
when the second distance value is not within the predetermined dead zone distance range, perform the step of enabling the far-channel receiving tube to receive the first reflected light beam acquired after the infrared light beam is reflected by the to-be-measured object to acquire the first distance value.

10. The screen-off processing device according to claim 8, wherein subsequent to performing the screen-off processing on the electronic device when the first distance value is within the predetermined screen-off distance range, the second processor is further configured to execute the computer program to:
when the first distance value is within a predetermined screen-on distance range, perform screen-on processing on the electronic device.

11. The screen-off processing device according to claim 10, wherein the second processor is further configured to execute the computer program to:
when the near-channel receiving tube is in an on state, enable the infrared-light-emitting tube to emit the infrared light beam at predetermined near-channel transmission power; and
when the far-channel receiving tube is in the on state, enable the infrared-light-emitting tube to emit the infrared light beam at predetermined far-channel transmission power,
wherein the far-channel transmission power is greater than the near-channel transmission power.

12. A non-transitory computer-readable storage medium storing therein a computer program, wherein the computer program is executed by a second processor to implement the screen-off processing method according to claim 4.

13. The non-transitory computer-readable storage medium according to claim 12, wherein the computer program is further executed by the second processor to:
when the second distance value is not within the predetermined dead zone distance range, perform the step of enabling the far-channel receiving tube to receive the first reflected light beam acquired after the infrared light beam is reflected by the to-be-measured object to acquire the first distance value.

14. The non-transitory computer-readable storage medium according to claim 12, wherein subsequent to performing the screen-off processing on the electronic device when the first distance value is within the predetermined screen-off distance range, the computer program is further executed by the second processor to:
when the first distance value is within a predetermined screen-on distance range, perform screen-on processing on the electronic device.

15. The non-transitory computer-readable storage medium according to claim 14, wherein the computer program is further executed by the second processor to:
when the near-channel receiving tube is in an on state, enable the infrared-light-emitting tube to emit the infrared light beam at predetermined near-channel transmission power; and
when the far-channel receiving tube is in the on state, enable the infrared-light-emitting tube to emit the infrared light beam at predetermined far-channel transmission power,
wherein the tsar-channel transmission power is greater than the near-channel transmission power.

16. A screen-off processing device for the electronic device according to claim 1, comprising:
an infrared light emission circuit configured to enable the infrared-light-emitting tube to emit an infrared light beam;
a first distance value acquisition circuit configured to enable the far-channel receiving tube to receive a first reflected light beam acquired after the infrared light beam is reflected by a to-be-measured object, to acquire a first distance value;
a first screen-off processing circuit configured to, when the first distance value is within a predetermined screen-off distance range, perform screen-off processing on the electronic device;
a second distance value acquisition circuit configured to, when the first distance value is not within the predetermined screen-off distance range and is within a predetermined switching distance range, enable the near-channel receiving tube to receive a second reflected light beam acquired after the infrared light beam is reflected by the to-be-measured object, to acquire a second distance value; and
a second screen-off processing circuit configured to, when the second distance value is within a predetermined dead zone distance range, perform the screen-off processing on the electronic device.

17. The screen-off processing device according to claim 16, further comprising that:
the first distance value acquisition circuit is called when the second distance value is not within the predetermined dead zone distance range.

18. The screen-off processing device according to claim 16, further comprising:
a screen-on processing circuit configured to, when the first distance value is within a predetermined screen-on distance range, perform screen-on processing on the electronic device.

19. The screen-off processing device according to claim 18, wherein the infrared light emission circuit comprises the first processor, the first processor comprises a near-channel transmission power transmission sub-circuit and a far-channel transmission power transmission sub-circuit:
the near-channel transmission power transmission sub-circuit configured to, when the near-channel receiving tube is in an on state, enable the infrared-light-emitting tube to emit the infrared light beam at predetermined near-channel transmission power; and
the far-channel transmission power transmission sub-circuit configured to, when the far-channel receiving tube is in the on state, enable the infrared-light-emitting tube to emit the infrared light beam at predetermined far-channel transmission power, wherein the far-channel transmission power is greater than the near-channel transmission power.

\* \* \* \* \*